April 20, 1937.   C. H. CUNO ET AL   2,077,744
FLUID FILTERING APPARATUS
Filed Jan. 8, 1935   3 Sheets-Sheet 1
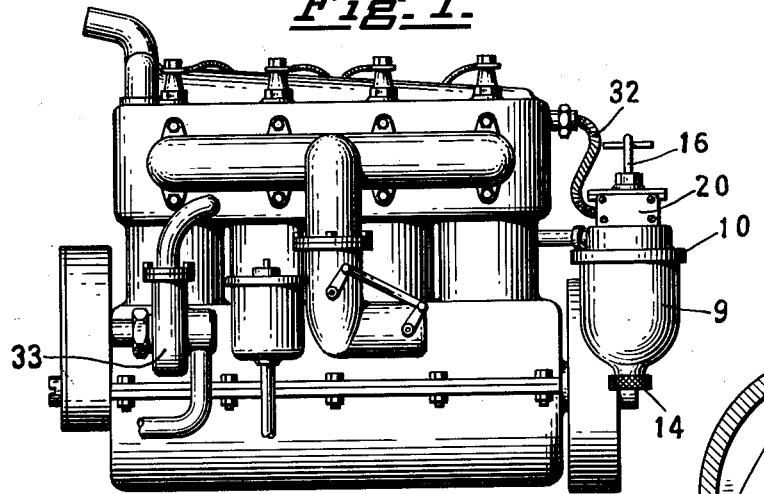
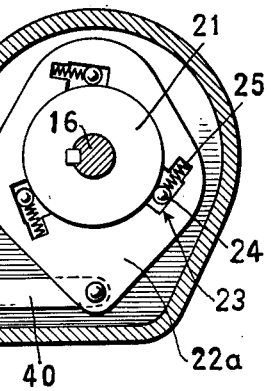
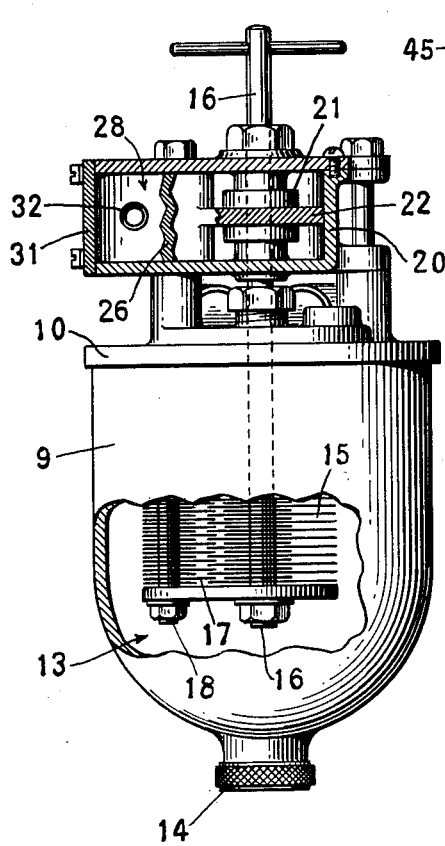
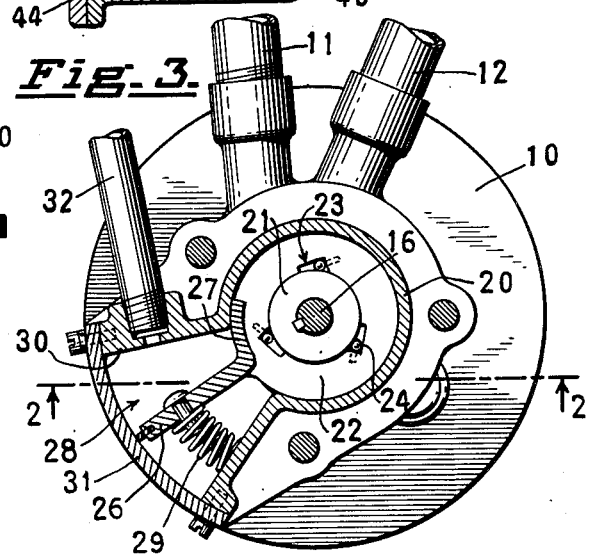
INVENTORS
CHARLES H. CUNO, AND
PHILIP E. ASHTON,
BY
ATTORNEY

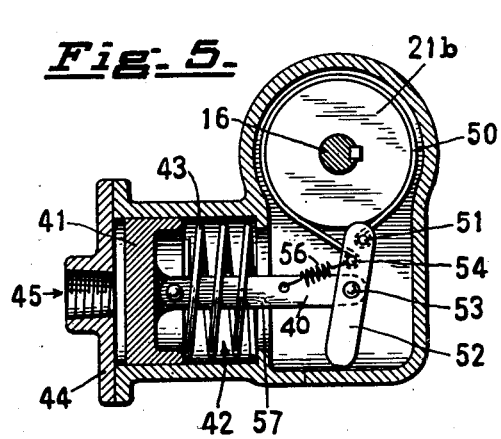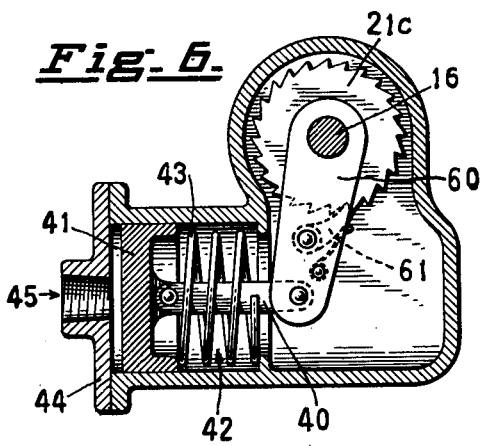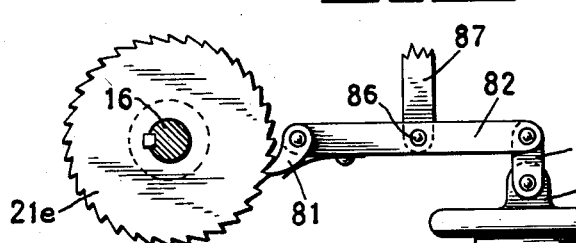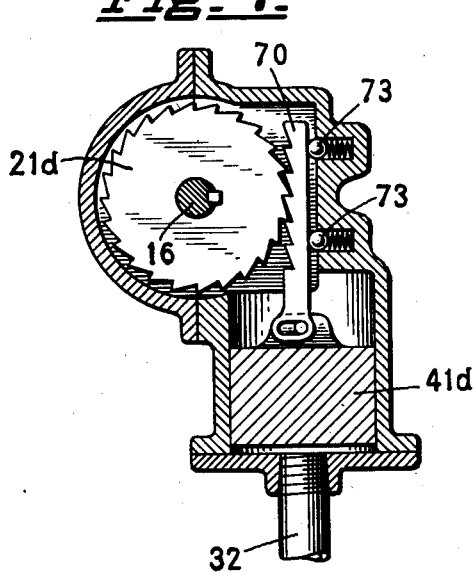

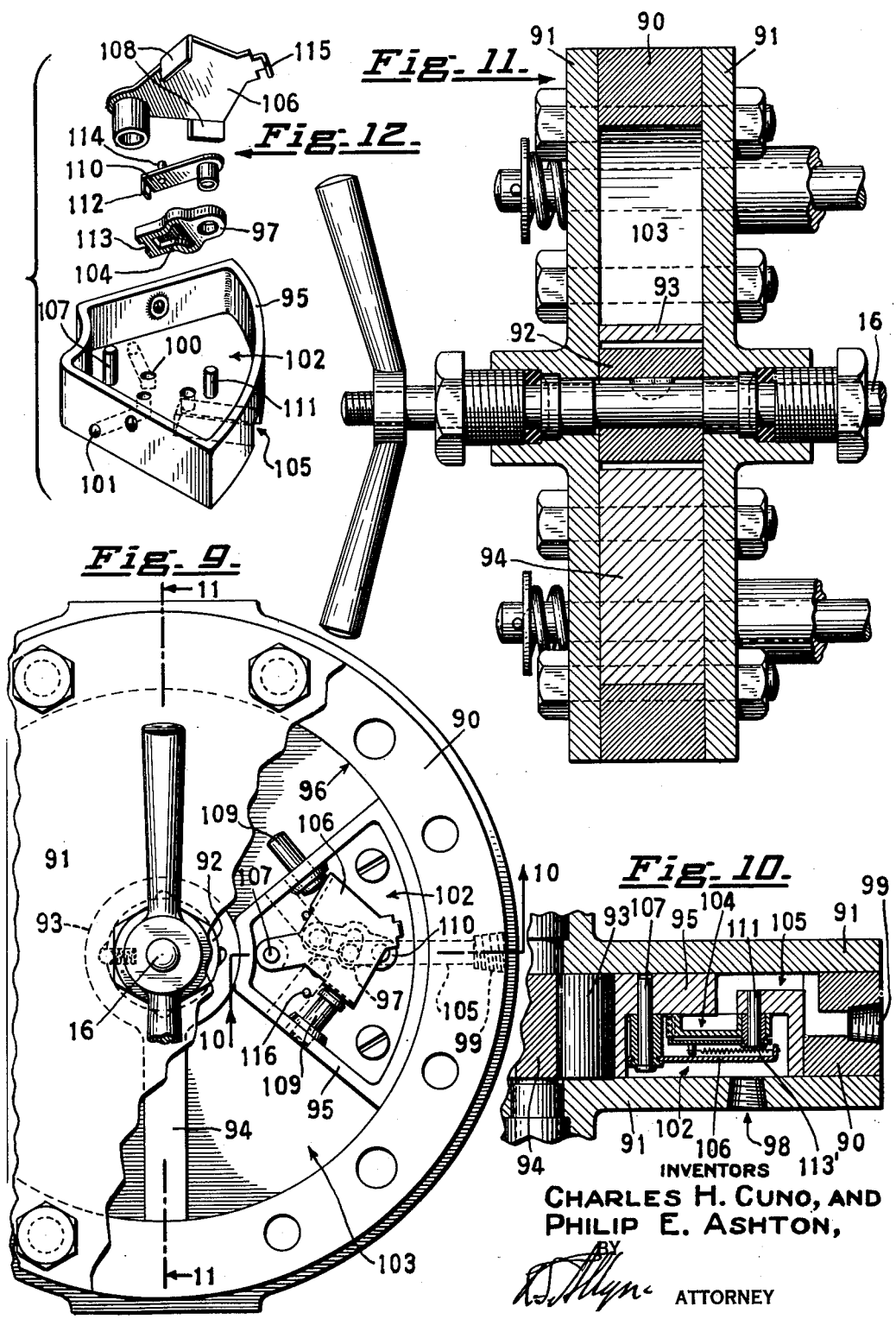

Patented Apr. 20, 1937

2,077,744

UNITED STATES PATENT OFFICE 2,077,744

FLUID FILTERING APPARATUS

Charles H. Cuno and Philip E. Ashton, Meriden, Conn., assignors to The Cuno Engineering Corporation, Meriden, Conn., a corporation of Connecticut Application January 8, 1935, Serial No. 821

8 Claims. (Cl. 210—167)

Our invention relates particularly to filters or strainers used in connection with various types of power devices such as motors or engines for filtering or straining fluids in connection therewith and this application is a partial continuation from our application Serial Number 627,546 filed August 5, 1932 now Patent 1,987,597 issued January 15, 1935.

Filters of the type shown in Cuno Patent 1,657,346 and Fulcher Patent 1,414,120 provide highly satisfactory means for filtering fluids under such circumstances. Filters may be used for filtering either the lubricating oil supply, the fuel supply, the cooling medium or other fluid. In the course of the use of such filters it is necessary to clean the filtering members. Such cleaning can be effected by producing relative movement between the filtering plates and the so-called scrapers. It is, of course, possible to effect this movement by hand but in some cases it is highly desirable to provide for the automatic cleaning action either with or without means for manual operation.

We have discovered that a very simple device can be provided for automatically cleaning filters by means of fluid pressure developed for instance from the forced feed cooling system or from the oil circulating system of a motor or engine.

When the engine is running there is, of course, a substantial pressure built up in the circulating system and we have accordingly designed means for utilizing this condition for moving one of the elements of the filter so as to clean it.

Fig. 1 is a side view showing an internal combustion engine with one form of filter and actuating means connected to the coolant system.

Fig. 2 is a side view and partial section showing the filter and actuating mechanism embodying our invention, the section being approximately on the line 2—2 of Fig. 3.

Fig. 3 is a horizontal section and plan view of parts shown in Fig. 2.

Figs. 4, 5, 6, 7 and 8 are detail sectional views showing other modified forms of devices for intermittently effecting the cleaning action of the filter.

Fig. 9 is a plan view of a modification of the device utilizing a continuous flow motor and parts being broken away.

Fig. 10 is a sectional view on the plane of the line 10—10 of Fig. 9.

Fig. 11 is a sectional view on the plane of the line 11—11 of Fig. 9.

Fig. 12 is an exploded perspective view of parts of the device of Figs. 9 to 11.

Our invention also covers devices for automatically cleaning filters on internal combustion engines for such purposes as lubricating oil, fuels, cooling mediums and any other fluids used in connection with internal combustion engines.

In the form shown the filter comprises a casing 9 with a head 10. These parts will usually be detachably connected together for convenience in installation, inspection and repair. The filter casing has inlet and outlet pipes 11 and 12 and the fluid to be filtered passes through the chamber 13. Such a casing also forms a sump having an outlet cap 14.

The filter proper in this form consists of a series of perforated plates 15 spaced apart from each other and supported on a central shaft 16. The fluid to be filtered passes usually inward between the peripheries of these plates and outward longitudinally of the axis in the manner set forth in the Cuno Patent 1,657,346 and the Fulcher Patent 1,414,120. Scraping fingers 17 are mounted on a post 18 and are adapted to project into the spaces between the filter plates so that when the filter plates are rotated with respect to the stationary scrapers material which is collected on or near the edges of the plates will be scraped off and fall down into the bottom of the casing.

The housing 20 surrounds one end of the shaft 16 and the shaft is provided with a hub 21 within the housing surrounded by a disc 22, which is mounted to oscillate back and forth about the hub. A one-way clutch or ratchet is interposed between the disc 22 and the shaft 16. In the form shown the disc is provided with one or more notches with inclined walls 23.

Balls or rollers 24 are pressed by springs 25 (see Fig. 4) into the spaces between the inclined walls 23 and the outer periphery of the hub 21 so that when the disc 22 is rotated clockwise the balls or rollers 24 wedge into the spaces between the outer wall of the hub 21 and the inclined walls 23 so that the rotation of the disc 22 is transmitted to the hub 21 and the shaft 16 of the filter plates. When the disc 22 rotates counter-clockwise the balls or rollers 24 tend to work back and no motion is transmitted from the disc 22 to the shaft 16.

Within the housing is mounted a plate or vane 26 which extends radially from the disc 22 and has a wall 27 which fits within the housing 20 so as to provide a chamber 28 which is substantially fluid-tight. A spring 29 tends to press the plate 26 toward the wall 30. The shaft 16 is free to be turned anti-clockwise by hand if desired. The outer end of the chamber 28 is closed by a plate 31 suitably held in position.

A pipe 32 connects the chamber 28 of the housing 20 with the cooling system of the internal combustion engine which is provided with the motor driven pump 33 for the cooling medium.

When the engine is not running there is no pressure in the cooling system or in pipe 32 or chamber 28 so that the pressure of the spring 29 holds the vane 26 against the wall 30. When the engine is started pressure is produced in the pipe 32 and chamber 28 which is sufficient to overcome the pressure of the spring 29 and turn the disc 22 anti-clockwise without rotating the shaft 16 of the filter.

When the motor stops or when the pump 33 stops and pressure falls in the circulating system the spring 29 turns the vane 26 clockwise. This motion of the vane carries the clutch plate or disc 22 with it in a clockwise direction and the balls or rollers 24 pressed by the springs 25 roll inwardly between the hub 21 and the sloping walls 23 until they are wedged against the hub and act as a one-way clutch so that the hub and shaft 16 rotate with the plate. The shaft being thus turned causes a relative motion between the filter plates 15 and the scraping fingers 17 which removes accumulated dirt from between the plates and allows it to fall to the bottom of the filter casing 9.

As the pump is started again the pressure in the pipe 32 and chamber 28 increases and overcomes the spring 29, the vane 26 is pushed in a counter-clockwise direction carrying the plate and clutch parts with it and allowing the hub and shaft to remain in their advanced position, the vane coming to rest against the spring or any stop. When the pump stops the spring 29 again acts to turn the vane 26, the clutch and the cleaner shaft 16.

These movements are repeated intermittently during the operation of the engine whenever conditions demand changes of pressure of sufficient magnitude to affect the clutch in the manner outlined above. Obviously the spring and clutch could be so designed that pressure would actuate the clutch and rotate the shaft and the spring when released would retract the clutch.

The filter may also be cleaned by rotating the shaft 16 by hand. When the clutch member is arranged as shown in Fig. 3, this cleaning rotation would be made in a clockwise direction so that the balls or rollers would not bind on the hub.

In the form shown in Fig. 4 the plate 22ᵃ is connected by a link 40 to a piston 41 which has reciprocating motion in a cylinder 42 against a spring 43. The cylinder head 44 has an opening 45 to which the end of the pipe 32 is attached.

When the pressure is low in the pipe 32 the spring 43 holds the piston 41 against or toward the head 44 in the position shown and the hub and shaft are free to be rotated manually in an anti-clockwise direction if desired. When the pressure rises to a point where the force of the spring is overcome the piston moves toward the right and the link 40 causes the plate 22ᵃ to rotate about the hub 21 when the one-way clutch action takes place and causes the cleaning movement of the shaft 16 as previously described. When the pump pressure ceases to overcome the spring, the spring rotates the clutch clockwise without turning the filter shaft.

In the form shown in Fig. 5 having a band type clutch the hub secured to the shaft 16 is extended to form a cylindrical drum 21ᵇ which is surrounded by the strap or band 50. One end of this band is secured to a bearing post 51 fixed near the end nearer the drum 21ᵇ of a lever 52 which is hinged to the lever 40 at 53. The other end of the band is secured to a bearing post 54 fixed to the lever 52 between the post 51 and the hinge 53. The lever 52 is constrained to move in an anti-clockwise direction under the bias of a spring 56.

As long as the pressure is low in the cylinder 42 the parts remain in the position shown and the shaft and drum are rotatable manually in an anti-clockwise direction within the band which is held loosely against the drum by the action of the spring 56.

When the pressure in the cylinder is increased sufficiently to move the piston to the right, the link 40 moves the hinge 53 in an anti-clockwise direction about the shaft 16 and contracts the band 50 into frictional engagement with the outer surface of the drum 21ᵇ which occurs very shortly after the piston starts and during the remainder of the piston movement the shaft, drum and band are turned together in an anti-clockwise direction. When the pressure is again reduced the piston moves to the left thus freeing the band from engagement with the drum, whereupon the shaft and drum remain in their advanced position and the band slips back around them until the piston comes to rest and the lever 52 is returned to the position shown, ready for the next cycle of operations.

Fig. 6 illustrates a further modification of ratchet type clutch in which the hub 21ᶜ on the shaft has ratchet teeth formed on its periphery set to receive anti-clockwise impulses. The arm 60 loosely mounted on shaft 16 is connected to link 40.

A spring pressed pawl 61 is pivoted to the link 60 and engages with the ratchet teeth on the hub. Under low pressure in the cylinder the parts remain as shown and the shaft may be rotated manually in an anti-clockwise direction, the pawl slipping over the ratchet teeth.

When the pressure is raised the piston moves to the right and the link 60 rotates about the axis of the shaft 16 in an anti-clockwise direction carrying the pawl and engaged ratchet hub, thereby rotating the shaft 16. When the pressure is again lowered the spring 43 moves the piston to the left and as the pawl slips over the ratchet teeth, the hub and shaft are left in their advanced positions.

Fig. 7 illustrates another form utilizing a ratchet hub 21ᵈ, the teeth of which are engaged by a toothed rack 70, one end of which is loosely connected to the piston 41ᵈ. The rack and ratchet are held in engagement by spring pressed balls 73 mounted in recesses in the wall of the casing and acting against the rack 71. Pressure in the cylinder raises the piston 41ᵈ and rotates the ratchet and shaft. The weight of the piston (assisted by a spring if desired) returns the piston and rack when pressure is released.

The shaft may be manually rotated in an anti-clockwise direction during which the rack 70 will move away from the ratchet teeth on the hub.

In the form shown in Fig. 8 the shaft 16 has a ratchet 21ᵉ which is engaged by a spring pressed pawl 81 carried at one end of a lever 82. The opposite end of the lever is connected by a link such as 83 with the free end 84 of an expansible and collapsible chamber or bellows 85. The lever 82 is fulcrumed at some point such as 86 to a fixed support 87 which may be suitably carried by the filter body.

The lower end of the bellows is secured to a fixed support 89 and has an opening in communication with the pressure pipe 32.

The sides of the bellows may be made of some resilient metal with annular corrugations which will permit the ends to move towards and from each other as the pressure in the pipe 32 decreases and increases, or the sides may be made of some other material such as rubber, fabric, leather or the like and have a spring under compression carried between the ends of the bellows to provide expanding and contracting actions.

With the device in this form an increase in the pressure in the pipe 32 causes the bellows to be expanded and the shaft 16 rotated clockwise.

When the pressure in the pipe 32 is again decreased the resilient member between the ends of the bellows causes the bellows to collapse and reverse the motion of the lever 82 and pawl 81 so that the pawl slips back over the teeth on the ratchet 21e. In this form manual rotation of the shaft 16 may be effected in a clockwise direction.

Figs. 9 to 12 show details of a continuous flow hydraulic type of motor which may be interposed in any force feed circulating system and employed to rotate the cleaning device of the filter by a step by step or intermittent action.

The short cylinder 90 has top and bottom plates 91 mounted on the shaft 16 which is the shaft of the rotatable member of the filter or geared to it. This shaft carriers the center part 92 of a one-way clutch the outer part 93 of which is mounted on the inner part and has a vane 94 capable of swinging back and forth in the cylinder. A valve box 95 is secured in the cylinder and fills in a segment of the space between the hub 93 and the rim or outer wall 96. The box 95 houses a toggle operated oscillating valve 97 which controls the direction of flow of the fluid which enters the cylinder at 98 and leaves at 99. The box has two valve ports 100 and 101 which lead from the chamber 102 in the box 95 to the chamber 103 in the motor cylinder. The valve 97 has a chamber 104 which communicates by passage 105 with the outlet 99 and alternately communicates with the ports 100 and 101.

The toggle plate 106 is pivoted on pin 107 and has two lugs 108 adapted to be alternately engaged by the plungers 109 which slide through the side walls of the box 95 and are alternately engaged by the vane 94 as it is forced around by the pressure of fluid in the cylinder.

The valve operating arm 110 has a hub pivoted on stud 111 and a lug 112 which fits a groove 113 in the valve 97. The other end of the valve is mounted on the hub of the arm 110.

The snapping-over spring 113' connects the pin 114 on the valve arm with the lug 115 on the toggle member. The inner face of the valve member slides back and forth over the ports 100 and 101 so as to alternately admit the fluid pressure first to one side of the vane 94 and then to the other as the valve is snapped back and forth by the toggle action. When port 100 is open into the chamber 102 and admitting power to move the vane in one direction, the other port 101 is open into the valve chamber 104 and exhausting from the other side of the vane to the outlet passages 105 and 99. The oscillating action may be limited by stops 116.

It will be seen that this provides an intermittent action of the clutch and cleaner shaft derived from a continuous flow of fluid.

It will thus be seen that we have provided mechanism which will positively and intermittently impart a rotating motion to the movable shaft of a filter applicable to the oil supply line or other liquid system of an engine which is operated and controlled by the changes in pressure within a circulating system of the engine whereby the cleaning action of the filter is performed with sufficient frequency under the action of the engine or usual pump.

While this invention has been illustrated and described as actuated by changes in pressure in a water cooling system, it should be understood that other occasional changes in pressure resulting from the operation of the engine or its accessories might be utilized for the same purpose, by connecting the pipe 32 to other sources of fluctuating positive pressure, such as a force feed oil lubricating system, an hydraulic brake system or an air brake system.

In such cases the pressure would act to move the piston or other actuating member and the clutch in one direction and the spring, suitably positioned and held in opposition thereto, would act to move the piston and turn the clutch in the opposite direction when the pressure falls to a point below the compressive strength of the spring.

The clutch action can be designed to move the shaft when the actuating member is being moved by the pressure and release the shaft when it is returned by the spring or vice versa.

Pressure can be intermittently provided or applied to the conduit 32 by action of the fluid operated or controlled brake pedal so that a cleaning action will take place whenever the brake is actuated. Similarly the clutch motor device 26 may be actuated by fluid power supplied for instance from hydraulic power transmission or from what are sometimes called air brake or hydraulic brake systems so that fluctuating pressure will actuate the clutch and thus clean the filter or supply clean filtering surfaces.

While the type of filter herein shown is greatly to be preferred for most cases, it should be understood that other forms of filters may be cleaned automatically as herein described, by rotation of a filtering member with respect to a cleaning member or vice versa, or by moving a clean filter element into position to replace one which has been in use.

We claim:

1. Motor lubricating means including a filter and means actuated by the cooling system for cleaning the filter.

2. A filter construction for an internal combustion engine comprising a filter member; a cleaning member, one of said members being rotatable with respect to the other for cleaning the filter member, a casing enclosing the two members and having a head, with inlet and outlet passages for the liquid to be filtered, a fluid pressure operated device mounted on said head outside the casing, a shaft carried in said head connected to said rotatable member, a clutch mechanism adapted to turn said shaft in one direction only, a movable element in said device connected to said clutch mechanism and means for connecting said device with a fluid circulating system of the motor.

3. The combination of an internal combustion motor and a filter including a rotatable cleaning element and clutch mechanism adapted to be connected to the rotatable element of the filter, a pressure operated device having a movable element connected to the clutch mechanism and means connecting said device with a source of pressure which is responsive to changes in engine operation whereby the filter cleaning action is effected by changes in the pressure in said source.

4. Actuating mechanism for cleaning a filter for use in connection with internal combustion engines comprising clutch mechanism adapted to be connected to a rotatable shaft of the filter, a pressure operated device having a movable element connected to the clutch mechanism and means connecting said device with a source of fluctuating pressure responsive to intermittent changes in engine operation whereby the filter cleaning action is effected by a substantial change in the pressure in said source.

5. Actuating mechanism for cleaning a filter for use in conjunction with a source of power comprising a clutch mechanism adapted to be connected to a movable part of the filter, a pressure operated device having a movable element connected to the clutch mechanism, and a means connecting said device with a source of pressure used in connection with said source of power as a cooling medium, whereby the filter cleaning action is effected by substantial changes in said source of pressure.

6. A filtering system for an internal combustion engine having a fluid cooling system including the combination of a filter having a cleaning means with a movable shaft and a pressure cooling system, clutch mechanism for actuating the filter shaft to present clean filter surfaces for action, a pressure operated device connected to the clutch mechanism and means connecting said device with the cooling system whereby fluctuation in the pressure in the cooling system actuates the movable shaft of the filter.

7. A filter system for an internal combustion motor comprising a filter having a shaft with cleaning means, a liquid cooling pump for the motor, and pressure actuated means connecting the pump and the filter shaft whereby changes in the pressure developed by the pump will clean the filter.

8. The combination with an internal combustion engine, of a filter, a casing, connections for the filter to the engine for filtering a fluid used in connection with the engine, a motor in an end portion of the filter casing responsive to change in fluid pressure, a filter cleaning element driven by said motor, connections from said motor to another fluid circuit of the engine from that in which the filter is located, whereby changes in pressure of the last mentioned fluid circuit effect a cleaning of said filter.

CHARLES H. CUNO.
PHILIP E. ASHTON.